(12) United States Patent
Hahn et al.

(10) Patent No.: US 6,869,685 B2
(45) Date of Patent: Mar. 22, 2005

(54) ADHESION BETWEEN RUBBER COMPONENTS

(75) Inventors: Bruce Raymond Hahn, Hudson, OH (US); Adel Farhan Halasa, Bath, OH (US); Wen-Liang Hsu, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 81 days.

(21) Appl. No.: 10/630,274

(22) Filed: Jul. 30, 2003

(65) Prior Publication Data

US 2004/0024129 A1 Feb. 5, 2004

Related U.S. Application Data

(62) Division of application No. 08/865,784, filed on May 30, 1997, now Pat. No. 6,646,054.

(51) Int. Cl.[7] .............................................. B32B 25/04
(52) U.S. Cl. ........................ 428/492; 525/236; 525/237
(58) Field of Search ......................... 428/492; 525/236, 525/237

(56) References Cited

U.S. PATENT DOCUMENTS

| | | | |
|---|---|---|---|
| 5,174,838 A | 12/1992 | Sandstrom et al. | 152/209 |
| 5,229,459 A | 7/1993 | Sandstrom et al. | 525/136 |
| 5,386,865 A | 2/1995 | Sandstrom et al. | 152/525 |
| 5,503,940 A | 4/1996 | Majumdar et al. | 428/492 |
| 5,580,930 A | 12/1996 | Kang et al. | 525/237 |

FOREIGN PATENT DOCUMENTS

GB 1071876 6/1967

OTHER PUBLICATIONS

Patent Abstracts of Japan, vol. 007, No. 34 (C–150), Feb. 10, 1983, and JP 57 185367 A (Kuraray KK), Nov. 15, 1982.

*Primary Examiner*—Bernard Lipman
(74) *Attorney, Agent, or Firm*—Alvin T. Rockhill

(57) ABSTRACT

The process of this invention can be utilized to improve the adhesion between rubber components. It is generally most useful for improving the adhesion between two different pre-cured rubber components or for improving the adhesion between a pre-cured rubber component and an uncured (green) rubber component. However, the technique of this invention can also be employed to improve the adhesion between two uncured rubber components. The technique of this invention is based upon the unexpected discovery that low molecular weight trans-1,4-polybutadiene containing rubber compounds can be used to improve the adhesion between rubber components. This invention more specifically reveals a technique for improving the adhesion between a first rubber component and a second rubber component in a process for manufacturing a cured rubber article, said technique comprising the steps of: (1) positioning a layer of an adhesion-promoting rubber composition which is comprised of a low molecular weight trans-1,4-polybutadiene rubber between the first rubber component and the second rubber component, (2) bringing the first rubber component into contact with one side of the layer of adhesion-promoting rubber composition and bringing the second rubber composition into contact with the other side of the layer of adhesion-promoting rubber composition and (3) curing the first rubber composition, the second rubber composition and the adhesion-promoting rubber composition together under conditions of heat and pressure to produce the cured rubber article.

20 Claims, No Drawings

ADHESION BETWEEN RUBBER COMPONENTS

This is a divisional application of U.S. patent application Ser. No. 08/865,784, filed on May 30, 1997 now U.S. Pat. No. 6,646,054.

BACKGROUND OF THE INVENTION

In manufacturing certain rubber articles, it is necessary to adhere pre-cured rubber components to uncured (green) rubber components. For instance, in retreading tires, an uncured tread can be affixed to a previously cured tire carcass. On the other hand, a previously cured tread could be affixed to an uncured carcass to simplify the process of building a new tire. In still other cases, it is desirable to adhere two pre-cured rubber components together.

Attaining adequate adhesion between a pre-cured rubber component and an uncured rubber component frequently proves to be challenging. An even greater challenge is presented in cases where it is desired to affix two pre-cured rubber components together. In such cases, cements and surface activation are frequently used to promote better adhesion. For example, surface activation is usually performed by buffing the surface of the pre-cured rubber component. However, the level of adhesion that can be attained via surface activation and cements sometimes proves to be inadequate.

SUMMARY OF THE INVENTION

This invention relates to a process for improving the adhesion between different rubber components in a rubber article, such as a tire, a hose or a belt. This technique can be used to improve the adhesion between two different pre-cured rubber components or for improving the adhesion between a pre-cured rubber component and an uncured rubber component. However, the technique of this invention can also be used to improve the adhesion between two uncured rubber components.

The technique of this invention is based upon the unexpected discovery that low molecular weight trans-1,4-polybutadiene containing rubber compounds can be used to improve the adhesion between rubber components in a rubber article. The adhesion-promoting rubber compositions of this invention will normally contain from about 10 weight percent to about 40 weight percent low molecular weight trans-1,4-polybutadiene and from about 60 weight percent to about 90 weight percent of at least one rubbery polymer. The rubbery polymer employed in such blends will typically be natural rubber or styrene-butadiene rubber. However, various other rubbery polymers (such as, synthetic polyisoprene, isoprene-butadiene rubber, styrene-isoprene-butadiene rubber or cis-1,4-polybutadiene rubber) can be utilized in the adhesion-promoting rubber composition. It is critical for the trans-1,4-polybutadiene employed in such blends to have a low molecular weight of no greater than about 150,000 and a trans-microstructure content which is within the range of about 60 percent to about 90 percent. It is preferred for the trans-1,4-polybutadiene to have a molecular weight of less than about 120,000.

The present invention more specifically discloses an adhesion-promoting rubber composition which is comprised of (a) from about 10 weight percent to about 40 weight percent trans-1,4-polybutadiene, wherein said trans-1,4-polybutadiene has a number average molecular weight which less than about 150,000 and wherein said trans-1,4-polybutadiene has a trans-microstructure content which is within the range of about 60 percent to about 90 percent and (b) from about 60 weight percent to about 90 weight percent of at least one rubbery polymer.

The subject invention further reveals a technique for improving the adhesion between a first rubber component and a second rubber component in a process for manufacturing a cured rubber article, said technique comprising the steps of: (1) positioning a layer of an adhesion-promoting rubber composition which is comprised of a low molecular weight trans-1,4-polybutadiene rubber between the first rubber component and the second rubber component, (2) bringing the first rubber component into contact with one side of the layer of adhesion-promoting rubber composition and bringing the second rubber composition into contact with the other side of the layer of adhesion-promoting rubber composition and (3) curing the first rubber composition, the second rubber composition and the adhesion-promoting rubber composition together under conditions of heat and pressure to produce the cured rubber article.

DETAILED DESCRIPTION OF THE INVENTION

The trans-1,4-polybutadiene used in the adhesion promoting rubber compositions of this invention is a thermoplastic resin by virtue of its high level of crystallinity. Because trans-1,4-polybutadiene (TPBD) contains many double bonds in its backbone, it can be blended and cocured with rubbers. Even though TPBD is a thermoplastic resin, it becomes elastomeric when cured alone or when cocured with one or more rubbers. The TPBD used in manufacturing the rubber articles of this invention typically has a trans-microstructure content which is within the range of about 60 percent to about 90 percent and a number average molecular weight which is within the range of about 5,000 to about 150,000.

The TPBD will preferably have a trans-microstructure content that is within the range of about 75 percent to about 85 percent. It will more preferably have a trans-microstructure content which is within the range of about 78 percent to 82 percent. The TPBD will preferably have a number average molecular weight which is within the range of about 50,000 to about 120,000 and will most preferably have a number average molecular weight which is within the range of about 70,000 to about 100,000. Such TPBD will typically have a Mooney ML-4 viscosity at 100° C. which is within the range of about 5 to about 20. The trans-1,4-polybutadiene will typically have a melting point which is within the range of about 10° C. to about 30° C. It will also have a glass transition temperature which is within the range of about −100° C. to about −80° C.

TPBD which is suitable for use in making the rubber articles of this invention can be made by various polymerization techniques. For instance, the TPBD can be synthesized by utilizing the procedure described in U.S. Pat. No. 5,753,579. The teachings of U.S. Pat. No. 5,753,579 are incorporated herein by reference in their entirety. In this technique, 1,3-butadiene monomer is polymerized into the TPBD in the presence of a barium catalyst system that is comprised of at least one organolithium initiator, an organoaluminum compound, a barium alkoxide and an organozinc compound. The TPBD can be synthesized by (1) mixing (a) an organolithium initiator or an organomagnesium initiator, (b) an organoaluminum compound, (c) a barium alkoxide and (d) an organozinc compound to produce a preformed initiator system; and (2) adding the preformed initiator system to a polymerization medium which is comprised of an organic solvent and 1,3-butadiene monomer. In such polymerizations, normally from 0.01 to 1 phm (parts per 100 parts by weight of monomer) of an organolithium initiator will be utilized. The molar ratio of the organoaluminum compound to the barium alkoxide will typically be within the range of about 0.1:1 to about 8:1. The molar ratio of the organolithium compound to the barium alkoxide will normally be within the range of about 0.1:1 to about 8:1. The molar ratio of the organozinc compound to the barium alkoxide will typically be within the range of about 0.1:1 to about 8:1. The polymerization temperature utilized will normally be within the range of about 40° C. to about 120° C.

The TPBD can also be synthesized with a cobalt-based catalyst systems. For example, U.S. Pat. No. 5,089,574 reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

The molecular weight of TPBD synthesized with cobalt-based catalyst systems can be reduced so as to be within the desired molecular weight range by depolymerizing the TPBD with a methasis catalyst. For example, the molecular weight of the TPBD can be reduced with tungsten hexachloride/triisobutyl aluminum/ethanol catalysts.

The adhesion-promoting rubber compositions of this invention are made by simply mixing the TPBD with one or more rubbery polymers. A wide variety of rubbery polymers can be used for this purpose. Some representative examples of rubbery polymers that can be used include natural rubber, styrene-butadiene rubber, synthetic polyisoprene, isoprene-butadiene rubber, styrene-isoprene-butadiene rubber and cis-1,4-polybutadiene. A blend of one or more these rubbery polymers can, of course, be utilized. Normally natural rubber and styrene-butadiene rubber are preferred with natural rubber being most preferred.

The adhesion-promoting rubber composition will typically contain from about 10 weight percent to about 40 weight percent of the TPBD and from about 60 weight percent to about 90 weight percent of the rubbery polymer. It is normally preferred for the adhesion-promoting rubber composition to contain from about 15 weight percent to about 30 weight percent of the TPBD and from about 70 weight percent to about 85 weight percent of the rubbery polymer. It is generally more preferred for the adhesion-promoting rubber composition to contain from about 18 weight percent to about 22 weight percent of the TPBD and from about 78 weight percent to about 82 weight percent of the rubbery polymer.

The adhesion-promoting rubber composition will normally be extruded or milled into a relatively thin layer for affixing the rubber components together. The layer of adhesion-promoting rubber composition will typically have a thickness which is within the range of about 10 mils (0.25 mm) to about 300 mils (7.62 mm). The layer of adhesion-promoting rubber composition will preferably have a thickness that is within the range of about 50 mils (1.27 mm) to about 160 mils (4.064 mm) and will more preferably have a thickness which is within the range of about 80 mils (2.03 mm) to about 120 mils (3.05 mm).

The technique of this invention simply involves positioning the layer of adhesion-promoting rubber composition between the two different rubber components being bound together. For instance, a layer of the adhesion-promoting rubber composition can be employed as a cushion in retreading tires. Then, the rubber components are forced together by the application of pressure with the adhesion-promoting rubber composition being trapped between the two rubber components. Strong adhesion can then be attained by curing (vulcanizing) the rubbers utilizing standard procedures. In most cases, the vulcanization will be carried out at a temperature which is within the range of about 100° C. to about 300° C. However, it is normally preferred to utilize a curing temperature that is within the range of about 135° C. to about 175° C. The curing step will, of course, also normally be carried out while applying pressure.

This invention is illustrated by the following examples, which are merely for the purpose of illustration and are not to be regarded as limiting the scope of the invention or the manner in which it can be practiced. Unless specifically indicated otherwise, parts and percentages are given by weight.

EXAMPLE 1

In this experiment, low molecular weight trans-1,4-polybutadiene was synthesized utilizing a barium catalyst system. In the procedure utilized, 2000 grams of a dried 20 percent 1,3-butadiene in hexane premix solution was charged into a 1-gallon (3.8 liter) reactor. Polymerization was initiated by adding 18.4 ml of 25 percent triethyl aluminum (in hexanes), 10 ml of 0.4 M barium nonylphenoxide (in hexanes), 12.5 ml of 1.6 M n-butyllithium (in hexane) and 1.1 ml of neat 2-(2-ethoxy-ethoxy) ethanol. The reaction mixture was agitated and maintained at a temperature of 80° C. After 4 hours, a total conversion of 95 percent was obtained. The polymerization mixture was then short-stopped with ethanol and stabilized with 2,6-tert-butyl-4-methyl phenol. After evaporating the hexanes solvent, the TPBD recovered was dried in a vacuum oven at 50° C. The TPBD was determined to have a melting point at 21° C. and had a glass transition temperature at −91° C. The polymer was also determined to have a microstructure which contained 80 percent trans-1,4-polybutadiene units, 4 percent 1,2-polybutadiene units and 16 percent cis-1,4-polybutadiene units. The Mooney ML-4 viscosity at 100° C. of the TPBD was determined to be 9.

EXAMPLE 2

In this experiment, the adhesion-promoting rubber composition of this invention was prepared and evaluated as a base compound. The adhesion-promoting rubber composition was made by mixing 20 parts of the TPBD synthesized in Example 1 with 80 parts of natural rubber, 28 parts of carbon black, 17 parts of silica, 2.5 parts of antidegradants, 2 parts of a tackifier, 1 parts of stearic acid, 5 parts of zinc oxide and 3 parts of a silica coupling agent to make a non-productive compound. Then, a productive compound was made by mixing 5 parts of sulfur, 5 parts of zinc oxide, 1 part of an antidegradant and 1 part of an accelerator into the non-productive compound.

For comparative purposes, another base compound was made utilizing the same procedure except for the fact that it was made utilizing 100 parts of natural rubber and no TPBD. The two base compounds were subsequently evaluated to determine their ability to adhere to a silica containing tire tread compound.

The silica containing tire tread compound was prepared by first mixing 25 parts of high cis-1,4-polybutadiene rubber (97 percent cis-microstructure), 34.38 parts of medium vinyl polybutadiene rubber (50 percent vinyl-microstructure), 50 parts of natural rubber, 60 parts of carbon black, 15 parts of silica, 1.5 parts of wax, 0.25 parts of peptizer, 1 part of phenol-formaldehyde resin, 3.5 parts of antidegradants and 3 parts of coumarone/indene resin to make a non-productive tire tread rubber compound. A productive tire tread compound was then made by mixing 0.75 parts of hexamethylmethoxymelamine, 0.85 parts of a sulfenamide accelerator, 0.2 parts of a quaternary ammonium salt, 0.4 parts of a disulfide accelerator, 0.75 parts of an amine accelerator, 1.2 parts of sulfur and 0.1 parts of a cure retarder into the non-productive rubber compound.

The productive silica containing tire tread rubber compound was then injection-molded into a 6-inch (15.2 cm) by 6-inch (15.2 cm) test sheet having a thickness of 100 mils (2.5 mm). The injection molding was carried out at a temperature of 170° C. utilizing a cycle time of about 2 minutes. Test sheets were then subsequently placed against the base compound made with the adhesion-promoting rubber composition of this invention and the comparative base compound. The rubbers were then cured together under a pressure of 100 pounds per square inch ($6.985 \times 10^5$ Pascals) at a temperature of 150° C. for 18 minutes. The force required to pull the two rubber components apart was then determined.

In the case of the control, a force of 142 Newtons was required to pull the rubber components apart. A force of 191 Newtons was required to pull the adhesion-promoting rubber composition of this invention from the silica containing base compound. Thus, the force required to pull the rubber components apart was increased by about 35 percent over that of the control when the adhesion-promoting rubber composition of this invention was utilized. Knotty tear into both the base rubber compound and the tire tread compound was observed by visual inspection in the case where the adhesion-promoting rubber composition was utilized. Knotty tear in both directions is indicative of excellent adhesion. However, in the case of the control, Knotty tear was only observed in the direction of the base compound.

EXAMPLE 3

The procedure utilized in Example 2 was repeated in this experiment except for the fact that silica was not included in the tire tread rubber compound. In the case of the control, a force of 127 Newtons was required to pull the rubber components apart. A force of 140 Newtons was required to pull the adhesion-promoting rubber composition of this invention from the non-silica containing base compound. Thus, the force required to pull the rubber components apart was increased by about 10 percent over that of the control when the adhesion-promoting rubber composition of this invention was utilized.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A technique for improving the adhesion between a first rubber component and a second rubber component in a process for manufacturing a cured rubber article, said technique comprising the steps of: (1) positioning a layer of an adhesion-promoting rubber composition which is comprised of (a) from about 10 weight percent to about 40 weight percent trans-1,4-polybutadiene, wherein said trans-1,4-polybutadiene has a number average molecular weight which is within the range of 50,000 to 120,000 and wherein said trans-1,4-polybutadiene has a trans-microstructure content which is within the range of about 60 percent to about 90 percent and (b) from about 60 weight percent to about 90 weight percent of at least one rubbery polymer, (2) bringing the first rubber component into contact with one side of the layer of adhesion-promoting rubber composition and bringing the second rubber composition into contact with the other side of the layer of adhesion-promoting rubber composition and (3) curing the first rubber component, the second rubber component, and the adhesion-promoting rubber composition together under conditions of heat and pressure to produce the cured rubber article.

2. A technique as specified in claim 1 wherein said trans-1,4-polybutadiene has a number average molecular weight which is within the range of about 70,000 to about 100,000.

3. A technique as specified in claim 2 wherein said rubbery polymer is selected from the group consisting of natural rubber, styrene-butadiene rubber, synthetic polyisoprene, isoprene-butadiene rubber, styrene-isoprene-butadiene rubber and cis-1,4-polybutadiene.

4. A technique as specified in claim 2 wherein said rubbery polymer is natural rubber.

5. A technique as specified in claim 2 wherein said rubbery polymer is styrene-butadiene rubber.

6. A technique as specified in claim 3 wherein said adhesion-promoting composition is comprised of about 15 weight percent to about 30 weight percent of said trans-1,4-polybutadiene and from about 70 weight percent to about 85 weight percent of said rubbery polymer.

7. A technique as specified in claim 6 wherein said trans-1,4-polybutadiene has a trans-microstructure content which is within the range of about 75 percent to about 85 percent.

8. A technique as specified in claim 7 wherein said adhesion-promoting composition is comprised of about 18 weight percent to about 22 weight percent of said trans-1,4-polybutadiene and from about 78 weight percent to about 82 weight percent of said rubbery polymer.

9. A technique as specified in claim 8 wherein said trans-1,4-polybutadiene has a trans-microstructure content which is within the range of about 78 percent to about 82 percent.

10. A technique as specified in claim 6 wherein said rubbery polymer is natural rubber.

11. A technique as specified in claim 6 wherein said rubbery polymer is natural rubber.

12. A technique as specified in claim 9 wherein said rubbery polymer is natural rubber.

13. A technique as specified in claim 1 wherein said trans-1,4-polybutadiene has a Mooney ML-4 viscosity at 100° C. which is within the range of about 5 to about 20.

14. A technique as specified in claim 1 wherein the trans-1,4-polybutadiene has a melting point which is within the range of about 10° C. to about 30° C.

15. A technique as specified in claim 14 wherein the trans-1,4-polybutadiene has a glass transition temperature which is within the range of about −100° C. to about −80° C.

16. A technique as specified in claim 1 wherein said layer of the adhesion-promoting rubber composition has a thickness of about 10 mils to about 300 mils.

17. A technique as specified in claim 1 wherein said layer of the adhesion-promoting rubber composition has a thickness of about 50 mils to about 160 mils.

18. A technique as specified in claim 1 wherein said layer of the adhesion-promoting rubber composition has a thickness of about 80 mils to about 120 mils.

19. A techniques as specified in claim 1 wherein the first rubber composition, the second rubber composition and the adhesion-promoting rubber composition are cured together at a temperature which is within the range of about 100° C. to about 300° C.

20. A techniques as specified in claim 1 wherein the first rubber composition, the second rubber composition and the adhesion-promoting rubber composition are cured together at a temperature which is within the range of about 135° C. to about 175° C.

* * * * *